United States Patent
Chen et al.

(10) Patent No.: US 11,551,067 B2
(45) Date of Patent: Jan. 10, 2023

(54) NEURAL NETWORK PROCESSOR AND NEURAL NETWORK COMPUTATION METHOD

(71) Applicant: Shanghai Cambricon Information Technology Co., Ltd, Pudong New Area (CN)

(72) Inventors: Tianshi Chen, Pudong New Area (CN); Xiaobin Chen, Pudong New Area (CN); Tian Zhi, Pudong New Area (CN); Zidong Du, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 0 days.

(21) Appl. No.: 16/520,041

(22) Filed: Jul. 23, 2019

(65) Prior Publication Data

US 2019/0347542 A1     Nov. 14, 2019

Related U.S. Application Data

(63) Continuation of application No. 16/283,711, filed on Feb. 22, 2019, now Pat. No. 10,896,369, which is a (Continued)

(30) Foreign Application Priority Data

Apr. 7, 2017    (CN) .......................... 201710227493.6

(51) Int. Cl.
*G06N 3/063*       (2006.01)
*G06F 9/30*         (2018.01)
*G06F 9/38*         (2018.01)

(52) U.S. Cl.
CPC ......... *G06N 3/063* (2013.01); *G06F 9/30029* (2013.01); *G06F 9/30025* (2013.01); *G06F 9/30083* (2013.01); *G06F 9/3802* (2013.01)

(58) Field of Classification Search
CPC ...................................................... G06N 3/063
(Continued)

(56) References Cited

U.S. PATENT DOCUMENTS 5,931,945 A    8/1999   Yung et al.
6,038,580 A    3/2000   Yeh
(Continued)

FOREIGN PATENT DOCUMENTS

CN     100586092 C    1/2010
CN     201726420 U    1/2011
(Continued)

OTHER PUBLICATIONS

Hennessy and Patterson, "Computer Architecture: A Quantitative Approach", 1996, Morgan Kaufmann Publishers, Second Edition, pp. 39-41 and 373-380 (Year: 1996).*
(Continued)

*Primary Examiner* — James D. Rutten
(74) *Attorney, Agent, or Firm* — Getech Law LLC; Jun Ye

(57) ABSTRACT

The present disclosure provides a neural network processor and neural network computation method that deploy a memory and a cache to perform a neural network computation, where the memory may be configured to store data and instructions of the neural network computation, the cache may be connected to the memory via a memory bus, thereby, the actual compute ability of hardware may be fully utilized, the cost and power consumption overhead may be
(Continued)

reduced, parallelism of the network may be fully utilized, and the efficiency of the neural network computation may be improved.

15 Claims, 5 Drawing Sheets

Related U.S. Application Data continuation-in-part of application No. PCT/CN2018/081929, filed on Apr. 4, 2018.

(58) Field of Classification Search
USPC .......................................................... 706/43
See application file for complete search history.

(56) References Cited

U.S. PATENT DOCUMENTS

| | | | |
|---|---|---|---|
| 6,330,657 | B1 | 12/2001 | Col et al. |
| 9,435,315 | B2 | 9/2016 | Kalnay |
| 2002/0027552 | A1 | 3/2002 | Lee |
| 2003/0088600 | A1 | 5/2003 | Lao et al. |
| 2004/0236920 | A1 | 11/2004 | Sheaffer et al. |
| 2010/0075645 | A1 | 3/2010 | Yamamura et al. |
| 2011/0087943 | A1* | 4/2011 | Mangione-Smith ........................ G06F 13/4022 714/748 |
| 2014/0081893 | A1 | 3/2014 | Modha |
| 2014/0278126 | A1 | 9/2014 | Adelman et al. |
| 2015/0356054 | A1 | 12/2015 | Barak et al. |
| 2016/0026912 | A1* | 1/2016 | Falcon .................. G06N 3/0454 706/25 |
| 2017/0083337 | A1* | 3/2017 | Burger .................. G06F 9/3859 |
| 2017/0270073 | A1* | 9/2017 | Badin ..................... G06F 17/16 |
| 2018/0165577 | A1* | 6/2018 | Young .................... G06N 3/063 |
| 2018/0174033 | A1* | 6/2018 | Davies .................. G06N 3/0635 |
| 2018/0174041 | A1* | 6/2018 | Imam ...................... G06N 3/049 |
| 2018/0197075 | A1* | 7/2018 | Modha ................... G06N 3/063 |
| 2018/0300600 | A1* | 10/2018 | Ma ........................... G06N 3/04 |
| 2019/0057304 | A1* | 2/2019 | Mathuriya ............ G06N 3/0445 |

FOREIGN PATENT DOCUMENTS

| | | | | |
|---|---|---|---|---|
| CN | 102508803 | A | 6/2012 | |
| CN | 102930336 | A | 2/2013 | |
| CN | 104750758 | A | 7/2015 | |
| CN | 104836822 | A | 8/2015 | |
| CN | 105426160 | A | 3/2016 | |
| CN | 106066783 | A | 11/2016 | |
| CN | 106155946 | A | 11/2016 | |
| CN | 106371972 | A | 2/2017 | |
| EP | 3624018 | A1 | 4/2018 | |
| EP | 3633526 | A1 | 4/2018 | |
| WO | 2016099779 | A1 | 6/2016 | |
| WO | WO-2016099779 | A1 * | 6/2016 | ........... G06F 17/153 |

OTHER PUBLICATIONS

M. Bocchi et al., "Design and implementation of a reconfigurable heterogeneous multiprocessor SoC," IEEE Custom Integrated Circuits Conference 2006, San Jose, CA, 2006, pp. 93-96 (Year: 2006).*
Sloss et al. "ARM Processor Fundamentals", in ARM System Developer's Guide, 2004, Chapter 2 (Year: 2004).*
S. Li et al., "Heterogeneous systems with reconfigurable neuromorphic computing accelerators," 2016 IEEE International Symposium on Circuits and Systems (ISCAS), 2016, pp. 125-128, doi: 10.1109/ISCAS.2016.7527186. (Year: 2016).*
Jialiang Zhang and Jing Li. 2017. Improving the Performance of OpenCL-based FPGA Accelerator for Convolutional Neural Network. In Proceedings of the 2017 ACM/SIGDA International Symposium on Field-Programmable Gate Arrays (FPGA '17). Association for Computing Machinery, New York, NY, USA, 25-34. (Year: 2017).*
PCT/CN2018081929, Search Report, dated May 30, 2018, 10 pages. (No English Translation).
Lazzizzera, et al.,Fast and Compact Controllers with Digital Neural Networks, Instrumentation and Measurement Technology Conference, 1997, pp. 226-231, IEEE.
CN201710227493.6, Office Action, dated Jan. 5, 2021, 9 pages. (No English Translation).
CN201710227493.6, Office Action, dated Apr. 23, 2020, 10 pages. (No English Translation).
EP19199524.0, Reply to Search Opinion/Written Opinion/IPER filed Sep. 9, 2020, 61 pages.
EP19199524.0, Communication Pursuant to Article 94(3) dated Dec. 21, 2020, 9 pages.
Donovan, et al., "Pixel Processing in a Memory Controller", 8222 IEEE Computer Graphics and Applications, Jan. 15, 1995, No. 1, 11 pages.
19 199 526.5-1231, Communication Pursuant to Article 94(3) dated Jan. 14, 2021, 10 pages.
Zekri, Restructuring and Implementations of 2D Matrix Transpose Algorithm Using SSE4 Vector Instructions, 2015, IEEE, 7 pages.
Shahbahrami, et al., Matrix Register File and Extended Subwords: Two Techniques for Embedded Media Processors, 2005, ACM, 9 pages.
EP19199526.5, Reply to Search Opinion/Written Opinion/IPER filed Oct. 2, 2020, 45 pages.
19199526.5-1231, Extended European Search Report, dated Mar. 5, 2020, 10 pages.
19 199 528.1-1203, Communication Pursuant to Article 94(3) dated Nov. 13, 2020, 8 pages.
18 780 474.5-1203, Communication Pursuant to Article 94(3) dated Nov. 25, 2020, 7 pages.
18 780 474.5-1203, Reply to Examination Report filed Oct. 12, 2020, 167 pages.
18780474.5-1203, Extended European Search Report, dated Feb. 24, 2020, 4 pages.
Qiu, et al., Going Deeper with Embedded FPGA Platform for Convolutional Neural Network, 2016,10 pages, ACM.
EP 19 199 521.6—Communication pursuant to Article 94(3) EPC, dated Mar. 3, 2022, 6 pages.
Rakesh Kumar, et al., "Singe-ISA Heterogeneous Multi-Core Architectures for Multithreaded Workload Performance", IEEE, 2004, 12 pages.
Abu Asaduzzaman, et al., "Evaluation of Application-Specific Multiprocessor Mobile System", Jan. 2004, 9 pages.

* cited by examiner

NEURAL NETWORK PROCESSOR AND NEURAL NETWORK COMPUTATION METHOD

TECHNICAL FIELD

The present disclosure relates to the technical field of artificial intelligence, and in particularly to a neural network processor and neural network computation method.

BACKGROUND

Artificial neural networks (ANN) abstract human neural networks from the perspective of information processing to establish simple models and create different networks according to different ways of connections. Currently, artificial neural networks have made great progress in many fields, and are widely used to solve practical problems in pattern recognition, intelligent robots, automatic control, predictive estimation, biology, medicine, economy, and other fields.

As a new type of dedicated processor, single-core neural network processors use special instructions to fully utilize parallelism of neural networks to perform neural network computations. However, since single-core neural network processors need to be compatible with most neural network models and support different existing neural networks and neural network computations with different scales, existing single-core neural network processors often have complex structures and high cost. In addition, single-core neural network processors also have problems of wasting hardware resources and high power consumption overhead. Meanwhile, single-core neural network processors are not accelerated for parallelism between different layers during a neural network computation, and still have room for optimization.

In this situation, it has become a direction for the improvement of neural network computation devices to complete neural network computations, make full use of neural network computation devices, and reduce redundancy in functional components by aiming at different neural network models and the scale of neural network computations under the condition of fully utilizing parallelism within a layer and between different layers during neural network computations.

SUMMARY (I) Technical Problem to be Solved

The present disclosure provides a neural network processor and neural network computation method. The processor and method may at least partially solve the technical problems as mentioned above.

(II) Technical Solutions

An aspect of the present disclosure provides a neural network processor including: a memory, a cache, and a heterogeneous processor;

the memory may be configured to store data and instructions for a neural network computation;

the cache may be connected to the memory via a memory bus;

the heterogeneous processor may be connected to the cache via a cache bus, for reading the data and the instructions for the neural network computation through the cache to accomplish the neural network computation, returning the computation result to the cache, and controlling the cache so that the computation result is written back into the memory.

In some embodiments, the heterogeneous processor may include:

at least two different types of computation cores for executing a neural network computation or a neural network layer computation; and one or more logic control cores configured to determine to perform a neural network computation or a neural network layer computation by dedicated cores and/or generic cores according to data of the neural network computation.

In some embodiments, the plurality of computation cores may include x generic cores and y dedicated cores, where the dedicated cores may be dedicated to perform assigned neural network/neural network layer computations, and the generic cores may be configured to perform arbitrary neural network/neural network layer computations.

In some embodiments, the generic core may be a CPU, and the dedicated core may be an NPU.

In some embodiments, the cache may include a shared cache and/or a non-shared cache, where one shared cache may be correspondingly connected to at least two cores in the heterogeneous processor via the cache bus, and one non-shared cache may be correspondingly connected to one core in the heterogeneous processor via the cache bus.

In some embodiments, the logic control core may be connected to the cache via the cache bus, may be configured to read data of the neural network computation through the cache, and may determine to perform a neural network computation and/or a neural network layer computation by taking the dedicated core and/or the generic core as a target core according to type and parameters for the neural network model in the data of the neural network computation.

In some embodiments, the logic control core may send a signal to the target core via a control bus directly, or via the cache, so as to control the target core to perform a neural network computation and/or a neural network layer computation.

The other aspect of the present disclosure provides a neural network computation method, in which using the neural network processor to perform a neural network including:

reading, by a logic control core in a heterogeneous processor, data and instructions of the neural network computation from a memory through a cache; and determining, by the logic control core in the heterogeneous processor, to perform a neural network computation and/or a neural network layer computation by dedicated cores and/or generic cores according to type and parameters for the neural network model in data of the neural network computation.

In some embodiments, the determining by the logic control core in the heterogeneous processor to perform the neural network layer computation by dedicated cores and/or generic cores according to the type and parameters for the neural network model in the data of the neural network computation may include:

determining, by the logic control core in the heterogeneous processor, whether or not an eligible dedicated core exists according to the type and parameters for the neural network model in the data of the neural network computation;

if a dedicated core m is eligible, the dedicated core m may be used as a target core; and the logic control core in the heterogeneous processor may send a signal to the target core and may send addresses corresponding to the data and the instructions of the neural network computation to the target core;

acquiring, by the target core, the data and the instructions of the neural network computation from the memory through a shared or non-shared cache according to the addresses, performing the neural network computation, and outputting a computation result to the memory through the shared or non-shared cache, thereby accomplishing the computation;

if no eligible dedicated core exists, the logic control core in the heterogeneous processor may send a signal to a generic core, and may send the addresses corresponding to the data and the instructions of the neural network computation to the generic core;

acquiring, by the generic core, the data and the instructions of the neural network computation from the memory through a shared or non-shared cache according to the addresses, performing the neural network computation, and outputting a computation result to the memory through the shared or non-shared cache, thereby accomplishing the computation;

In some embodiments, the eligible dedicated core may refer to a dedicated core that supports an assigned neural network computation and supports the scale of the assigned neural network computation.

In some embodiments, the determining by the logic control core in the heterogeneous processor to perform the neural network computation by dedicated cores and/or generic cores according to the type and parameters for the neural network model in the data of the neural network computation may include:

analyzing, by the logic control core in the heterogeneous processor, the type and parameters for the neural network model in the data, determining for each neural network layer respectively whether an eligible dedicated core exists, and allocating a corresponding generic core or dedicated core for each neural network layer, to obtain a core sequence corresponding to the neural network layer;

sending, by the logic control core in the heterogeneous processor, addresses corresponding to data and the instructions of the neural network layer computation to the dedicated core or generic core corresponding to the neural network layer, and sending a serial number of a next dedicated core or generic core in the core sequence to the dedicated core or generic core corresponding to the neural network layer;

reading, by the dedicated core and generic core corresponding to the neural network layer, the data, and the instructions of the neural network layer computation from the addresses, performing the neural network layer computation, and sending a computation result to an assigned address of the shared and/or non-shared cache;

controlling, by the logic control core, the shared and/or non-shared cache to write the computation result of the neural network layer back to the memory, thereby completing the computation.

In some embodiments, the eligible dedicated core may refer to a dedicated core that supports an assigned neural network layer computation and supports the scale of the assigned neural network layer computation.

In some embodiments, the neural network computation may include a pulse neural network computation; the neural network layer computation may include a convolution, a fully connected layer computation, a concatenation computation, a bitwise addition/multiplication, a Relu computation, a pooling computation and/or a Batch Norm computation on the neural network layer.

(III) Technical Effects

It can be learnt from the above technical solutions that the neural network processor and neural network computation method according to the present disclosure may have at least one of the following technical effects:

(1) By using a heterogeneous processor for a neural network computation, different cores can be selected for the computations according to the type and scale of the actual neural network, thereby the actual computational capacity of hardware may be fully utilized, and the cost and the power consumption may be reduced.

(2) Different cores perform computations of different layers, and the computations of different layers are performed in parallel, thereby parallelism of the neural network may be fully utilized, and the efficiency of the neural network computation may be improved.

BRIEF DESCRIPTION OF THE DRAWINGS

The drawings are intended to facilitate further understanding of the present disclosure and constitute a part of the specification, and, together with the embodiments below, serve to explain the present disclosure, rather than limit the present disclosure. In the drawings.

DETAILED DESCRIPTION

Figure 1:
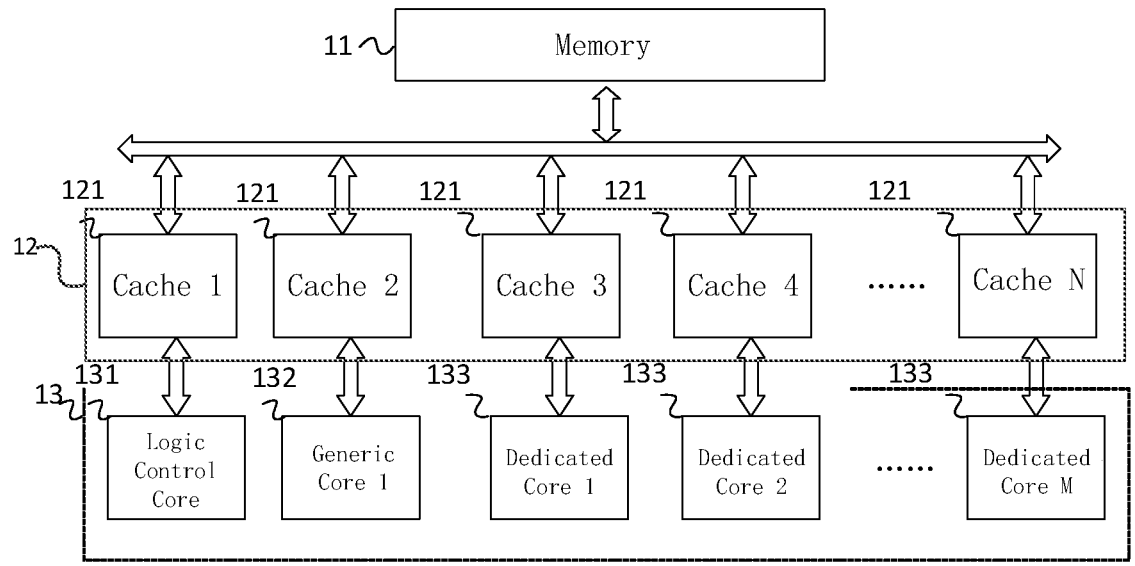
FIG. 1 schematically shows a heterogeneous multicore neural network processor according to one embodiment of the present disclosure.

To facilitate the understanding of the object, technical solutions, and advantages of the present disclosure, the present disclosure will be further described in detail below with reference to the specific embodiments and drawings.

It should be noted that in the drawings or the description of the specification, the similar reference numbers are used for similar or identical parts. Implementing modes not shown or described in the drawings are known to those of ordinary skill in the art. Additionally, although examples including parameters of specific values may be provided herein, it should be understood that the parameters are not necessarily exactly equal to the corresponding values, but may approximate the corresponding values within acceptable tolerances or design constraints. The directional terms mentioned in the embodiments, such as "upper", "lower", "front", "back", "left", "right", etc., only refer to the directions in the drawings. Therefore, the directional terms here are used to describe, rather than limit, the scope of protection of the present disclosure.

An embodiment of the present disclosure provides a heterogeneous multi-core neural network processor, as shown in FIG. 1, including: a memory 11, a non-shared cache 12, and a heterogeneous processor 13.

The memory 11 may be configured to store data and instructions of a neural network computation, where the data may include offsets, weights, input data, output data, types and parameters for the neural network model, and the like. Of course, the output data may not be stored in the memory; the instructions may include all kinds of instructions corresponding to the neural network computation, such as CONFIG instructions, COMPUTE instructions, IO instructions, NOP instructions, JUMP instructions, MOVE instructions, and the like. The data and the instructions stored in the memory 11 can be transmitted to the heterogeneous processor 13 through the non-shared cache 12.

The non-shared cache 12 may include a plurality of caches 121, in which each cache may be connected to the memory 11 via a memory bus and may be connected to the heterogeneous processor 13 via a cache bus, to fulfill data exchanges between the heterogeneous processor 13 and the non-shared cache 12, as well as the non-shared cache 12 and the memory 11. When the data or instructions of the neural network computation required by the heterogeneous processor 13 are not stored in the non-shared cache 12, the non-shared cache 12 may read the required data or instructions from the memory 11 via the memory bus first, and then transmit the required data or instructions to the heterogeneous processor 13 via the cache bus.

The heterogeneous processor 13 may include a logic control core 131, a generic core 132, and a plurality of dedicated cores 133, and both of the logic control core 131 and the generic core 132 and each of the dedicated cores 133 may be connected to corresponding caches 121 via the cache bus.

The heterogeneous processor 13 may be configured to read the instructions and data of the neural network computation from the non-shared cache 12, complete the neural network computation, and return a computation result to the non-shared cache 12 to control the non-shared cache 12 to write the computation result back to the memory 11.

The logic control core 131 may read the data and the instructions of the neural network computation from the non-shared cache 12, and determine whether a dedicated core 133 that is capable of supporting the neural network computation and supporting the scale of the neural network computation exists according to the type and parameters for the neural network model in the data. If such dedicated core exists, the neural network computation may be accomplished by the dedicated core 133; if such dedicated core does not exist, the neural network computation may be completed by the generic core 132. In order to determine a location of a dedicated core and whether it is idle, a table (called a dedicated/generic core information table) may be configured for each kind of core (dedicated cores supporting a same layer belong to one class, and the generic core belongs to one class), in the table serial numbers (or addresses) of a same kind of cores and whether they are currently idle may be recorded. All cores may be initially idle, and then the change of idle state may be maintained by direct or indirect communication between the logic control core and other cores. The serial numbers of the cores in the table can be acquired by scanning once during initialization of the network processor, so that the dynamically configurable heterogeneous processor may be supported (in other words, type and count of dedicated processors in the heterogeneous processor can be changed at any time, and the core information table is scanned and updated after the change). Optionally, the dynamic configuration of the heterogeneous processor may not be supported, and in this case, the serial numbers of the cores in the table may only need to be fixed without a need of scanning and updating for several times. Optionally, if the serial numbers of each type of dedicated cores are always continuous, a reference address may be recorded, and then a number of consecutive bits may be used to represent these dedicated cores, and bit 0 or 1 can indicates whether these dedicated cores are idle. In order to determine the type and parameters for the network model, a decoder can be set in the logic control core to determine a type of a network layer according to an instruction, and can determine whether the instruction is a generic core instruction or dedicated core instruction; and the parameters, data addresses, and the like may also be analyzed from the instruction. Optionally, the data may be configured to include a data head containing serial numbers and size of each network layer, addresses of corresponding computing data and instructions, and the like, and a special analyzer (either software or hardware) may be provided to analyze the information. Optionally, the analyzed information may be stored in a specified area. In order to determine which core to use based on the analyzed network layer serial number and size, a content addressable memory (CAM) may be set in the logic control core, and the content in the CAM may be implemented as configurable, which may require the logic control core to provide some instructions to configure/write this CAM. The contents in the CAM may include the network layer serial numbers, maximum scale that each dimension can support, and addresses of dedicated cores supporting a layer in the dedicated core information table as well as an address of the generic core in the generic core information table. Under this scheme, an analyzed layer serial number may be used to find a corresponding item in a table, and compare with a scale limit; if the corresponding item is found in the table, the addresses of the dedicated cores in the dedicated core information table may be adopted to find an idle dedicated core, and a control signal may be sent according to a serial number of the idle dedicated core and a computing task is assigned to the idle dedicated core; if a corresponding layer is not found in the CAM, or the scale limit is exceeded, or no idle core exists in the dedicated core information table, the address of the generic core information table may be adopted to find an idle generic core, a control signal may be sent according to a serial number of the generic core and a computing task may be assigned to the generic core; if no idle core is found in both tables, the task may be added to a waiting queue together with some necessary information; once an idle core capable of computing this task exists, the task may be assigned to the core for computation.

Of course, a location of a dedicated core and whether the dedicated core is idle may be determined in many ways. The above-mentioned method of determining the location of the dedicated core and whether the dedicated core is idle is only an illustrative explanation. Each dedicated core 133 can independently perform a type of neural network computation, such as a spiking neural network (SNN) computation and other designated neural network computations, write a computation result back to a correspondingly connected cache 121 of the dedicated core, and control the cache 121 to write the computation result back to the memory 11.

The generic core 132 can independently complete a neural network computation beyond the computation scale supported by a dedicated core or that is not supported by any dedicated core 133, write a computation result back to a correspondingly connected cache 121, and control the cache 121 to write the computation result back to the memory 11.

Figure 2:
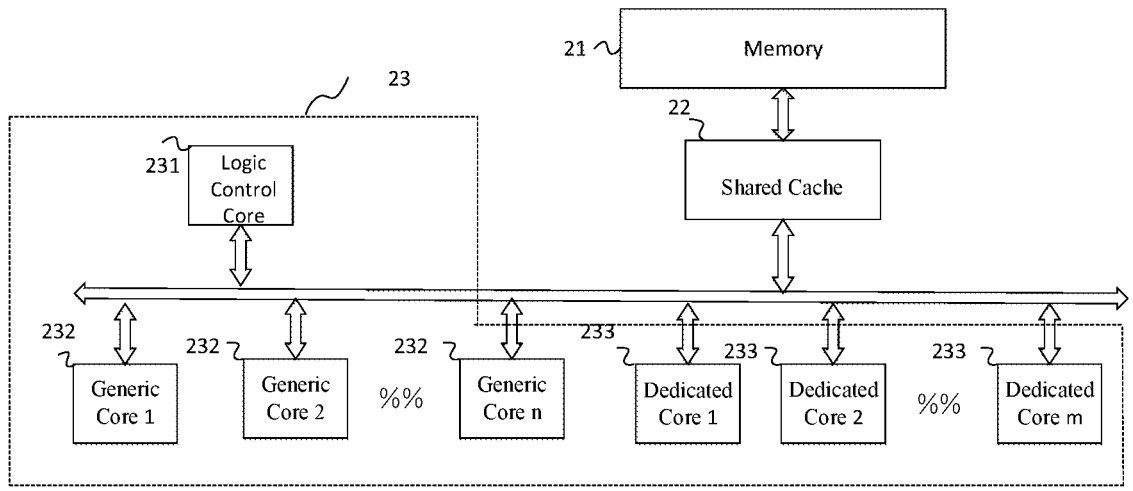
FIG. 2 schematically shows a heterogeneous multicore neural network processor according to another embodiment of the present disclosure.

One embodiment of the present disclosure provides a heterogeneous multi-core neural network processor, as shown in FIG. 2, including: a memory 21, a shared cache 22, and a heterogeneous processor 23.

A memory 21 may be configured to store data and instructions of a neural network computation, where the data may include offsets, weights, input data, output data, and type and parameters for the neural network model; the instructions may include various kinds of instructions corresponding to the neural network computation. The data and the instructions stored in the memory can be transmitted to the heterogeneous processor 23 through the shared cache 22.

A shared cache 22 may be connected to the memory 21 via a memory bus, and may be connected to the heterogeneous processor 23 via a cache bus to achieve data exchanges between the heterogeneous processor 23 and the shared cache 22 as well as the shared cache 22 and the memory 21.

When the data and the instructions of the neural network computation required by the heterogeneous processor 23 are not stored in the cache 22, the shared cache 22 may read the required data or instructions from the memory 21 via the memory bus first, and then transmit the required data or instructions to the heterogeneous processor 23 via the cache bus.

The heterogeneous processor 23 may include a logic control core 231, a generic core 232 and a plurality of dedicated cores 233, and both of the logic control core 231 and the generic core 232 and each of the dedicated cores 233 may be connected to the shared caches 22 via the cache bus.

The heterogeneous processor 23 may be configured to read the data and the instructions of the neural network computation from the shared cache 22, complete the neural network computation, send a computation result to the cache 22, and control the shared cache 22 to write the computation result back to the memory 21.

In addition, when data transmission is required between the logic control core 231 and the generic cores 232, between the logic control core 231 and the dedicated cores 233, among the generic cores 232, and among the dedicated cores 233, a core that sends data can first transmit the data to the shared cache 22 via the shared cache bus, and then transmit the data to a core that receives data without passing through the memory 21.

As to the neural network computation, a neural network model of the neural network computation may generally include a plurality of neural network layers, each of the neural network layers may perform a corresponding computation with a computation result of a previous neural network layer, and a computation result of a present layer may be output to a next neural network layer, in which a computation result of a last neural network layer may be a result of the whole neural network computation. In the heterogeneous multi-core neural network processor of this embodiment, both of the generic cores 232 and the dedicated cores 233 can perform a computation of a neural network layer, and the logic control core 231, the generic cores 232, and the dedicated cores 233 can complete a neural network computation jointly. Hereinafter, a neural network layer is referred to as a layer for convenience of description.

Each of the dedicated cores 233 can independently perform a computation of a layer, e.g., a convolution computation, a fully connected layer computation, a concatenation computation, a bitwise addition/multiplication, a Relu computation, a pooling computation or Batch Norm computation of a neural network layer, etc., and computation scale of the neural network layer cannot be too large, in other words, the computation scale of the neural network layer cannot exceed computation scale of a neural network layer supported by a corresponding dedicated core, which means a computation of the dedicated core may impose limitations on a count of neurons and synapses in the layer. Upon completion of the computation of the layer, a computation result may be written back to the shared cache 22.

The generic cores 232 may be configured to perform a computation of a layer exceeding the computation scale supported by the dedicated cores 233 or a computation of a layer that is not supported by any of the dedicated cores, write a computation result back to the shared cache 22, and control the shared cache 22 to write the computation result back to the memory 21.

Furthermore, after a dedicated core 233 and a generic core 232 write computation results back to the memory 21, the logic control core 231 may send a signal of starting computation to a dedicated core or generic core that performs a computation of a next layer, and notify the dedicated core or generic core that performs the computation of the next layer to start the computation.

Even furthermore, a dedicated core 233 and a generic core 232 may start a computation after receiving a signal of starting computation sent from a dedicated core or generic core that performs a computation of a previous layer and when no layer computation is being performed currently; if a layer computation is currently being performed, the computation may not be started until the current layer computation is completed and a computation result of the current layer computation is written back to the shared cache 22.

The logic control core 231 may read the data of the neural network computation from the shared cache 22, analyze each layer of the neural network model for the type and parameters of the neural network model in the data. As for each layer, the logic control core 231 may determine whether or not a dedicated core 233 that supports a computation of the layer and supports the computation scale of this layer exists. If such dedicated core exists, the computation of the layer may be performed by the corresponding dedicated core 233, and if such dedicated core does not exist, the computation of the layer may be performed by a generic core 232. The logic control core 231 may also provide corresponding addresses of the data and the instructions required for layer computations by the generic cores 232 and the dedicated cores 233, and the generic cores 232 and the dedicated cores 233 may read the data and the instructions at the corresponding addresses, and perform the layer computations.

As for a dedicated core 233 and a generic core 232 that execute a computation of a first layer, the logic control core 231 may send a signal of starting computation to the dedicated core 233 or the generic core 232 at the beginning of the computation, and after the neural network computation is completed, a dedicated core 233 or a generic core 232 that performs a computation of a last layer may send a signal of starting computation to the logic control core 231. After receiving the signal of starting computation, the logic control core 231 may control the shared cache 22 to write a computation result back to the memory 21.

Figure 3:
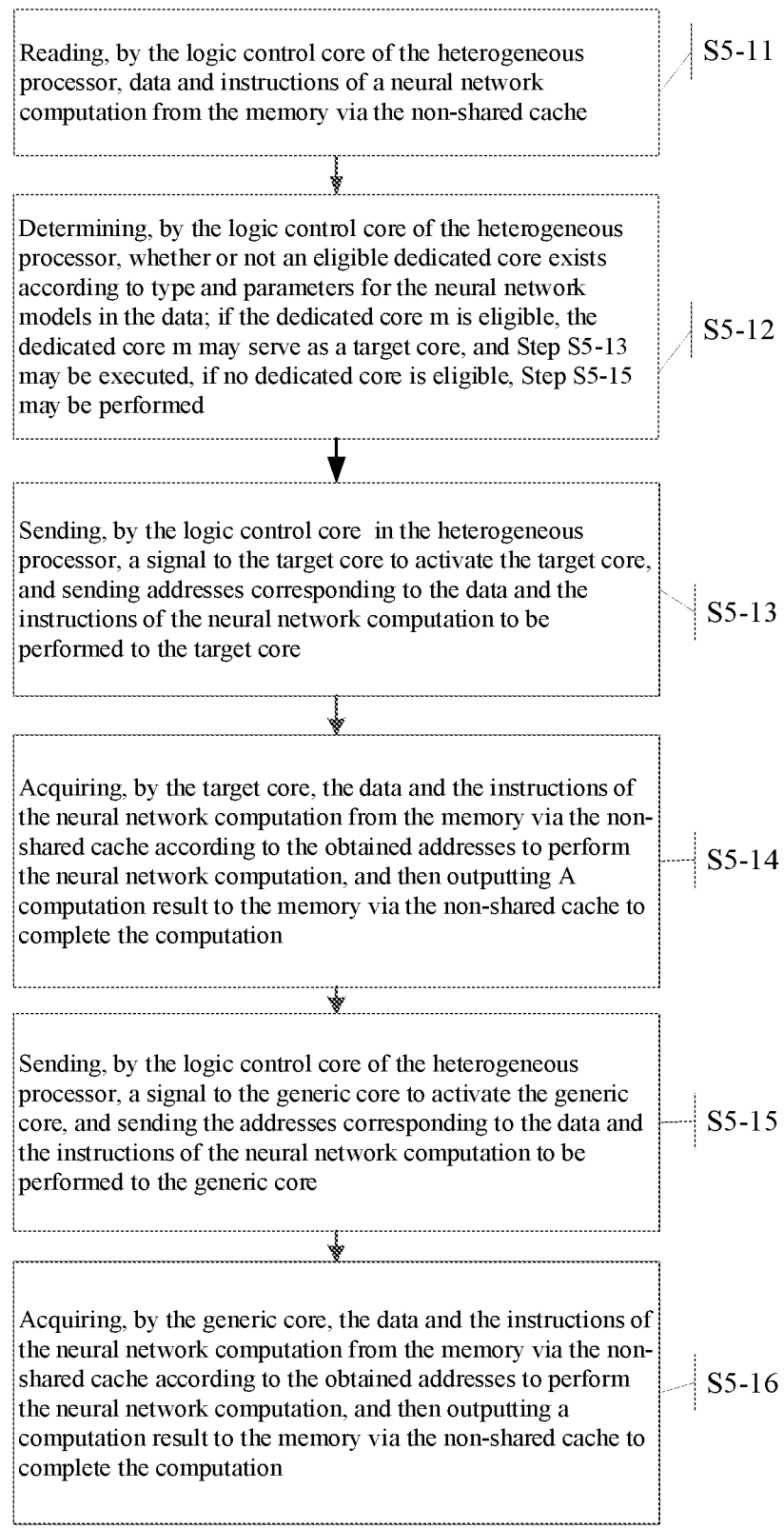
FIG. 3 is a flow chart of a neural network computation method according to another embodiment of the present disclosure.

One embodiment of the present disclosure provides a method for performing a neural network computation by the heterogeneous multi-core neural network processor of the first embodiment. As shown in FIG. 3, the method includes:

Step S5-11: reading, by the logic control core 131 of the heterogeneous processor 13, data and instructions of a neural network computation from the memory 11 via the non-shared cache 12;

Step S5-12: determining, by the logic control core 131 of the heterogeneous processor 13, whether or not an eligible dedicated core exists according to type and parameters for the neural network model in the data, where the term "eligible" may refer to that the dedicated core supports the neural network computation and supports scale of the neural network computation (a scale restriction may be inherent in the dedicated core, which may be provided by a design manufacturer of the core; or the scale restriction may be imposed by users, e.g., it may be found by experiments that beyond certain scale, the generic core is more effective; the scale restriction may be set when configuring the CAM). If the dedicated core m is eligible, the dedicated core m may serve as a target core, and Step S5-13 may be performed, if no dedicated core is eligible, Step S5-15 may be performed, where m is a serial number of the dedicated core, $1 \leq m \leq M$, M is a count of the dedicated cores;

Step S5-13: sending, by the logic control core 131 in the heterogeneous processor 13, a signal to the target core to activate the target core, and sending addresses corresponding to the data and the instructions of the neural network computation to be performed to the target core at the same time;

Step S5-14: acquiring, by the target core, the data and the instructions of the neural network computation from the memory 11 via the non-shared cache 12 according to the obtained addresses to perform the neural network computation, and then outputting a computation result to the memory 11 via the non-shared cache 12 to complete the computation;

further, following the Step S5-12, if no eligible dedicated core exists, Steps S5-15 and S5-16 may be performed subsequently;

Step S5-15: sending, by the logic control core 131 of the heterogeneous processor 13, a signal to the generic core 132 to activate the generic core 132, and sending the addresses corresponding to the data and the instructions of the neural network computation to be performed to the generic core 132 at the same time;

Step S5-16: acquiring, by the generic core 132, the data and the instructions of the neural network computation from the memory 11 via the non-shared cache 12 according to the obtained addresses to perform the neural network computation, and then outputting a computation result to the memory 11 via the non-shared cache 12 to complete the computation.

Figure 4:
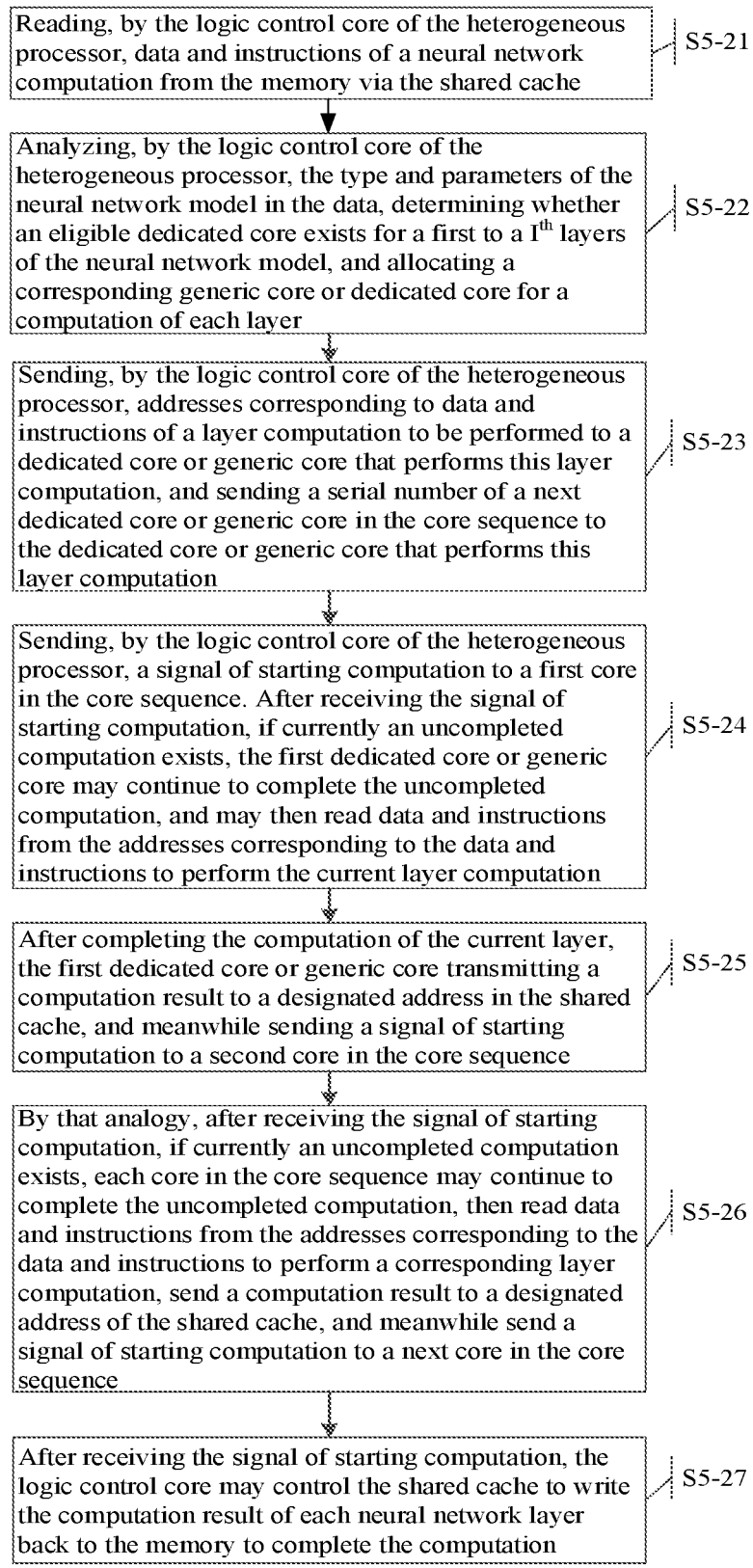
FIG. 4 is a flow chart of a neural network computation method according to another embodiment of the present disclosure.

One embodiment of the present disclosure provides a method for performing a neural network computation by the heterogeneous multi-core neural network processor according to the second embodiment. As shown in FIG. 4, the method includes:

Step S5-21: reading, by the logic control core 231 of the heterogeneous processor 23, data and instructions of a neural network computation from the memory 21 via the shared cache 22;

Step S5-22: analyzing, by the logic control core 231 of the heterogeneous processor 23, type and parameters of the neural network model in the data, determining whether an eligible dedicated core exists for each of a first to a $I^{th}$ layers of the neural network model, where I is a count of the layers of the neural network model, and the term "eligible" may refer to that a dedicated core supports a computation of a layer and supports computation scale of the layer, and allocating a corresponding generic core or dedicated core for a computation of each layer.

As for the computation of a $i^{th}$ layer of the neural network model, $1 \leq i \leq I$, if the dedicated core m is eligible, the dedicated core m may be chosen to perform a computation of the $i^{th}$ layer of the neural network model, where m is a serial number of the dedicated core, $1 \leq m \leq M$, M is a count of the dedicated cores. If no dedicated core is eligible, the generic core M+n may be chosen to perform the computation of the $i^{th}$ layer of the neural network model, where M+n is a serial number of the generic core, $1 \leq n \leq N$, N is a count of the generic cores, where the dedicated cores 233 and the generic cores 232 are numbered uniformly (in other words, the dedicated cores and the generic cores may be numbered together, for example, for x dedicated cores and y generic cores, the dedicated cores and the generic cores can be numbered from 1 to x+y, and each dedicated core or each generic core corresponds to a serial number from 1 to x+y; certainly, the dedicated cores and the generic cores may also be numbered separately, for example, for x dedicated cores and y generic cores, the dedicated cores can be numbered from 1 to x, and the generic cores can be numbered from 1 to y, and each dedicated core or each generic core corresponds to a serial number). However, in this situation, a number of a dedicated core may be the same as a number of a generic core, but the two numbers are the same only in terms of logical numbers, and the dedicated core and the generic core can be addressed according to their physical addresses to obtain a core sequence corresponding to the computations of the first to $I^{th}$ layers of the neural network model finally. In other words, this core sequence may contain I elements in total, and each element may be a dedicated core or a generic core, and the dedicated core or the generic core corresponds to the computation of the first to the $I^{th}$ layers of the neural network model sequentially. For example, a core sequence 1a, 2b . . . i1, where 1, 2, i represent serial numbers of the neural network layers, and a, b, 1 represent serial numbers of the dedicated cores or generic cores.

Step S5-23: sending, by the logic control core 231 of the heterogeneous processor 23, addresses corresponding to data and instructions of a layer computation to be performed to a dedicated core or generic core that performs this layer computation, and sending a serial number of a next dedicated core or generic core in the core sequence to the dedicated core or generic core that performs this layer computation, where it is a serial number of the logic control core that is sent to a dedicated core or generic core executing a last layer computation;

Step S5-24: sending, by the logic control core 231 of the heterogeneous processor 23, a signal of starting computation to a first core in the core sequence. After receiving the signal of starting computation, if currently an uncompleted computation exists, the first dedicated core 233 or generic core 232 may continue completing the uncompleted computation, and may then read data and instructions from the addresses corresponding to the data and the instructions to perform the current layer computation;

Step S5-25: after completing the computation of the current layer, the first dedicated core 233 or generic core 232 transmitting a computation result to a designated address in the shared cache 22, and meanwhile sending a signal of starting computation to a second core in the core sequence;

Step S5-26: by that analogy, after receiving the signal of starting computation, if currently an uncompleted computation exists, each core in the core sequence may continue completing the uncompleted computation, then read data and instructions from the addresses corresponding to the data and the instructions to perform a corresponding layer computation, send a computation result to a designated address of the shared cache 22, and meanwhile send a signal of starting computation to a next core in the core sequence, where a last core in the core sequence may send a signal of starting computation to the logic control core 231;

Step S5-27: after receiving the signal of starting computation, the logic control core 231 may control the shared cache 22 to write the computation result of each neural network layer back to the memory 21 to complete the computation.

Figure 5:
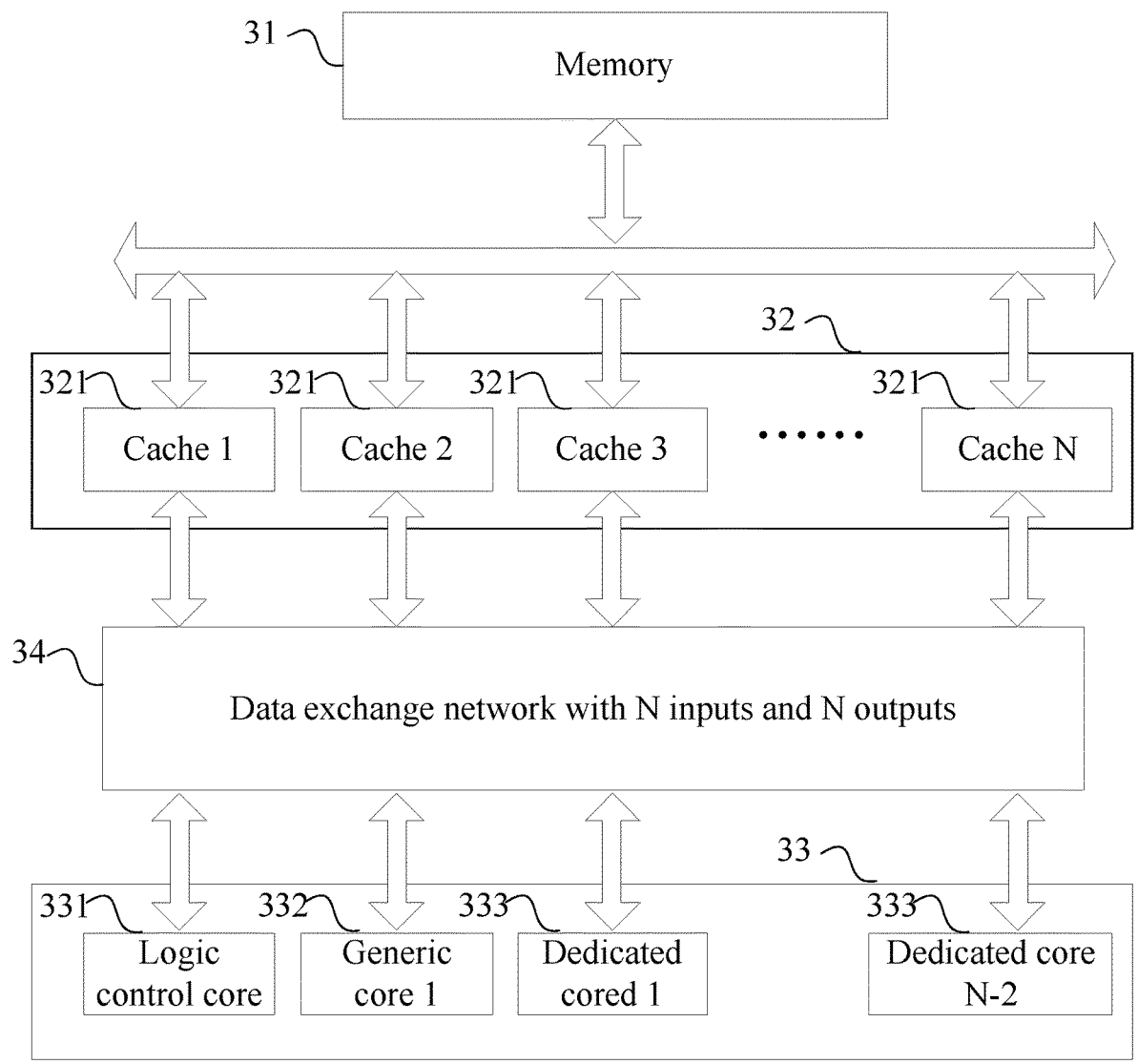
FIG. 5 schematically shows a heterogeneous multicore neural network processor according to another embodiment of the present disclosure.

As shown in FIG. 5, the embodiment is a further extension of the first embodiment. The cache 121 in Embodiment 1 (FIG. 1) is dedicated to each core, and a dedicated core 1 can only access a cache 3, but no other caches, so do the other cores, so the non-shared cache 12 formed by 121 has a non-shared nature. However, if a core j uses a computation result of a core i (i≠j) (the result is initially stored in a cache corresponding to the core i), the core i must first write this result from the cache to the memory 11, and then the core j reads the result from the memory 11 into a cache that the core j can access, after this process, the core j can use this result. To make this process more convenient, an N×N data exchange network 34 is added, for example, a crossbar may be used to realize the data exchange network, so that each core (331 or 332 or 333) can access all caches (321). At this point 32 has a shared nature.

A method for performing a neural network computation by the device of the embodiment as shown in FIG. 5 includes:

Step S5-31: reading, by the logic control core 331 in the heterogeneous processor 33, data and instructions of a neural network computation from the memory 31 through the cache 32;

Step S5-32: determining, by the logic control core 331 in the heterogeneous processor 33, whether or not an eligible dedicated core exists according to type and parameters for the neural network model in the data, where the term "eligible" may refer to that the dedicated core supports the neural network computation and supports the scale of the neural network computation; if the dedicated core m is eligible, the dedicated core m may serve as a target core, and Step S5-33 may be performed, if no dedicated core is eligible, Step S5-35 may be performed, where m is a serial number of the dedicated core;

Step S5-33: sending, by the logic control core 331 in the heterogeneous processor 33, a signal to the target core to activate the target core, and sending addresses corresponding to the data and the instructions of the neural network computation to be performed to the target core at the same time;

Step S5-34: acquiring, by the target core, the data and the instructions of the neural network computation according to the obtained addresses (from the cache 32) to perform the neural network computation, and then storing a computation result to the cache 32 to complete the computation;

Step S5-35: sending, by the logic control core 331 in the heterogeneous processor 33, a signal to the generic core 332 to activate the generic core 332, and sending the addresses corresponding to the data and the instructions of the neural network computation to be performed to the generic core 332 at the same time;

Step S5-36: acquiring, by the generic core 332, the data and the instructions of the neural network computation according to the obtained addresses (from the cache 32) to perform the neural network computation, and then storing the computation result to the cache 32 to complete the computation.

Figure 6:
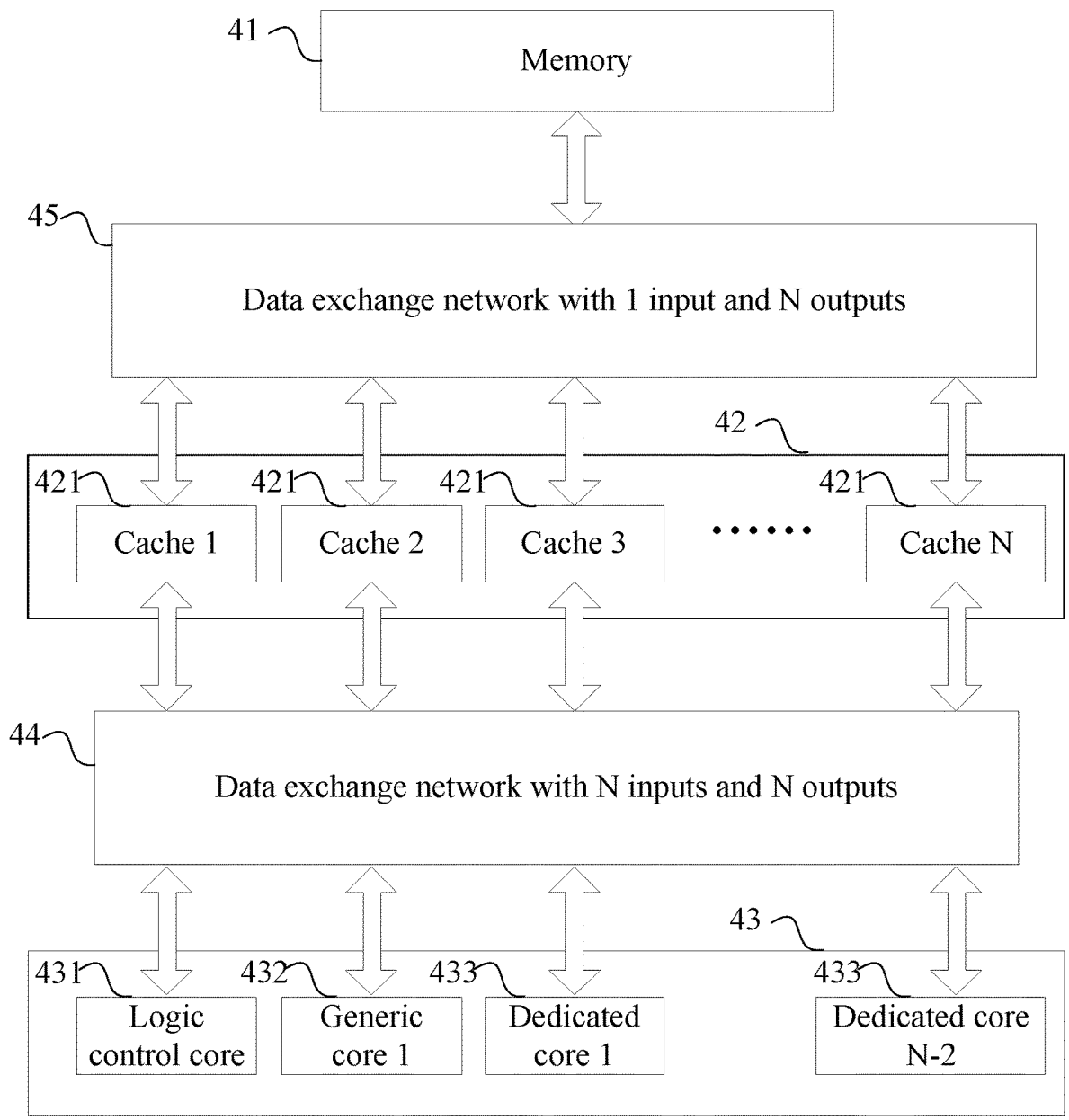
FIG. 6 schematically shows a heterogeneous multicore neural network processor according to another embodiment of the present disclosure.

Further, a way of connection between the memory and the cache may be changed, thereby producing a new embodiment as shown in FIG. 6. Compared with the embodiment shown in FIG. 5, a difference may be shown in the way of connection between a memory 41 and a cache 42. The embodiment of FIG. 5 uses a bus for connecting, and when the plurality of caches 321 write the memory 31, the plurality of caches need to queue, which may not be efficient (see FIG. 5). By abstracting the structure in FIG. 6 as a data exchange network with 1 input and N outputs, a function of data exchange network with 1 input and N outputs can be implemented by using a variety of topologies, such as a star structure (both of the memory 41 and the N caches 421 are connected via dedicated pathways), a tree structure (the memory 41 is at the root position, while the caches 421 are at the leaf positions), and the like.

It should be noted that the present disclosure does not make any limitation on a count of the logic control cores, a count of the dedicated cores, a count of the generic cores, a count of the shared or non-shared caches, and a count of the memories, and they can be properly adjusted according to specific requirements for the neural network computation.

Heretofore, the embodiments of the present disclosure have been described in detail in conjunction with the drawings. Based on the above description, those skilled in the art should have a clear understanding of the neural network processor and neural network computation method of the present disclosure.

In some embodiments, the present disclosure provides a chip including an above-mentioned neural network processor.

In some embodiments, the present disclosure further provides a chip package structure including the above-mentioned chip.

In some embodiments, the present disclosure further provides a board including the above-mentioned chip package structure.

In some embodiments, the present disclosure further provides an electronic device including the above-mentioned board.

The electronic device may include a data processing device, a robot, a computer, a printer, a scanner, a tablet, a smart terminal, a mobile phone, a driving recorder, a navigator, a sensor, a camera, a server, a cloud server, a camera, a video camera, a projector, a watch, an earphone, a mobile storage, a wearable device, a transportation, a household appliance, and/or a medical facility.

The transportation includes an airplane, a ship, and/or a vehicle. The household appliance includes a television set, an air conditioner, a microwave oven, a refrigerator, a rice cooker, a humidifier, a washing machine, an electric lamp, a gas stove, and a range hood. The medical device includes a nuclear magnetic resonance instrument, a B-ultrasound machine, and/or an electrocardiograph.

It should be noted that, for the sake of brevity, the foregoing method embodiments are all described as a combination of a series of actions, but those skilled in the art should understand that the present disclosure is not limited by the described sequence of actions, because certain steps may be performed in other sequences or concurrently in accordance with the present disclosure. Furthermore, those skilled in the art should also understand that the embodiments described in the specification are all optional embodiments, and the actions and units involved are not necessarily required by the present disclosure.

The above various embodiments are described with different focuses, and the parts that are not detailed in a certain embodiment can be found in the related descriptions of other embodiments.

In the several embodiments provided herein, it should be understood that the disclosed device may be implemented in other ways. For example, the device embodiments described above are merely illustrative. For example, the division of the units is only a logical functional division. In actual implementations, there may be other dividing manners, for example, combining multiple units or components or integrating them into another system, or ignoring or not executing some features. In addition, the mutual coupling or direct coupling or communication connection shown or discussed may be indirect coupling or communication connection through some interfaces, devices or units, and may be in an electrical form or other forms.

The units described as separate components may or may not be physically separated, and the components presented as units may or may not be physical units; that is, they may be located in one place, or may be distributed to multiple network units. Some or all of the units may be selected according to actual needs to achieve the purpose of the technical solution of the embodiment.

In addition, the respective functional units in the respective embodiments of the present disclosure may be integrated into one processing unit, or each unit may exist in a physically independent manner, or two or more units may be integrated in one unit. The above integrated unit can be implemented in the form of hardware or in the form of a software program unit.

The integrated unit, if implemented in the form of a functional software unit and sold or used as a standalone product, may be stored in a computer readable memory. Based on such understanding, the essence of the technical solution of the present disclosure or the part of the technical solution which makes a contribution to the prior art or the whole or part of the technical solution may be embodied in the form of a software product. The computer software product is stored in a memory which includes a number of instructions for causing a computer device (which may be a personal computer, server or network device, etc.) to perform all or some of the steps of the method described in each embodiment of the present disclosure. The foregoing memory includes various media that can store program codes, such as USB stick, Read-Only Memory (ROM), Random Access Memory (RAM), removable hard disk, magnetic disk, CD, and the likes.

Those skilled in the art may understand that all or some of the steps in the methods of the above embodiments can be completed with related hardware instructed by a program. The program can be stored in a computer readable memory. The memory may include: flash disk, Read-Only Memory (ROM), Random Access Memory (RAM), magnetic disk, CD, and the likes.

The above description of the disclosed embodiments enables those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments shown herein, but satisfies the broadest scope consistent with the principles and novel features disclosed herein.

It should be noted that the implementations that are not shown or described in the drawings or the description are all known to those skilled in the art, and are not described in detail. In addition, the above definitions of the various elements and methods are not limited to the specific structures, shapes or manners mentioned in the embodiments, and modifications and alternation can be readily conceived by those skilled in the art.

The foregoing embodiments further explain the objective, the technical solution, and the advantageous effects of the present disclosure. It is appreciated that the foregoing is merely specific embodiments of the present disclosure, and is not intended to be limiting. Any modification, equivalent substitution, improvements, etc. made within the spirit and principles of the present disclosure shall be included in the scope of the present disclosure.

What is claimed is:

1. A neural network processor, comprising:
   a cache; and
   a heterogeneous processor connected to the cache, wherein the heterogeneous processor includes:
   a dedicated core configured to perform one or more types of neural network operations,
   a generic core configured to perform other types of neural network operations unsupported by the dedicated core, and
   a logic control core configured to:
   receive one or more instructions that indicate one or more neural network operations for computation of a layer of a neural network,
   determine whether at least a portion of the one or more neural network operations is supported by the dedicated core and whether the dedicated core supports a size of the computation of the layer of the neural network,
   instruct the dedicated core to perform the at least a portion of the one or more neural network operations based on the determination that at least a portion of the one or more neural network operations is supported by the dedicated core and that dedicated core supports the size of the computation of the layer of the neural network, and
   instruct the generic core to perform the one or more neural network operations based on the determination that the one or more neural network operations cannot be performed by the dedicated core or that the dedicated core does not support the size of the computation of the layer of the neural network.

2. The neural network processor of claim 1, further comprising: a memory configured to store the one or more instructions for the neural network operations, wherein the cache is connected to the memory to receive the one or more instructions for the neural network operations sent from the memory.

3. The neural network processor of claim 2, wherein, the heterogeneous processor is further configured to return a computation result to the cache and instruct the cache to write the computation result back into the memory.

4. The neural network processor of claim 3, wherein the cache is connected to the memory via a memory bus and the heterogeneous processor is connected to the cache via a cache bus.

5. The neural network processor of claim 4,
   wherein the cache includes a non-shared cache,
   wherein the non-shared cache includes a plurality of secondary caches,
   wherein the heterogeneous processor includes a plurality of dedicated cores,
   wherein the logic control core, the generic core and each of the dedicated cores are respectively connected to one of the secondary caches via the cache bus, wherein each of the dedicated cores is configured to perform a type of the neural network operations, and wherein the generic core is configured to perform a neural network operation unsupported by any of the dedicated cores.

6. The neural network processor of claim 4, wherein the cache is a shared cache, wherein the heterogeneous processor includes a plurality of generic cores and a plurality of dedicated cores, wherein each of the dedicated cores is configured to perform a type of neural network operation, and wherein the generic cores are configured to perform a neural network operation unsupported by any of the dedicated cores.

7. A neural network computation method, comprising:

performing, by a dedicated core of a heterogeneous processor, one or more types of neural network operations, wherein the heterogenous processor is connected to a cache;

performing, by a generic core of the heterogenous processor, other types of neural network operations unsupported by the dedicated core;

receiving, by a logic control core, one or more instructions that indicate one or more neural network operations for computation of a layer of a neural network;

determining, by the logic control core, whether at least a portion of the one or more neural network operations is supported by the dedicated core and whether the dedicated core supports a size of the computation of the layer of the neural network;

instructing, by the logic control core, the dedicated core to perform the at least a portion of the one or more neural network operations based on the determination that at least a portion of the one or more neural network operations is supported by the dedicated core and that dedicated core supports the size of the computation of the layer of the neural network; and instructing, by the logic control core, the generic core to perform the one or more neural network operations based on the determination that the one or more neural network operations cannot be performed by the dedicated core or that the dedicated core does not support the size of the computation of the layer of the neural network.

8. The neural network computation method of claim 7, further comprising:

prior to the heterogeneous processor receiving neural network data and the one or more instructions for the neural network operations from the cache, reading, by the cache, the neural network data and the one or more instructions for the neural network operations from a memory.

9. The neural network computation method of claim 8, further comprising:

after performing the one or more neural network operations, sending a computation result to the cache, and controlling the cache to write the computation result back to the memory.

10. The neural network computation method of claim 8, further comprising:

determining, by the logic control core in the heterogeneous processor, whether or not an available dedicated core exists according to type and parameters for a neural network model in the neural network data, identifying the available dedicated core as a target core, sending, by the logic control core in the heterogeneous processor, a signal to the target core;

sending addresses corresponding to the neural network data and the instructions of the neural network operation to the target core, acquiring, by the target core, the neural network data and the instructions of the neural network operations from the memory through a non-shared cache according to the addresses, performing the neural network operations, and outputting a computation result to the memory through the non-shared cache.

11. The neural network computation method of claim 10, further comprising:

if no available dedicated core exists, sending, by the logic control core in the heterogeneous processor, a signal to a generic core, and sending the addresses corresponding to the neural network data and the instructions of the neural network operation to the generic core, acquiring, by the generic core, the neural network data and the instructions of the neural network operations from the memory through the non-shared cache according to the addresses, performing the neural network operation, and outputting a computation result to the memory through the non-shared cache.

12. The neural network computation method of claim 10, wherein, the available dedicated core is a dedicated core that supports the neural network operations and supports size of the neural network operation.

13. The neural network computation method of claim 11, further comprising:

analyzing, by the logic control core in the heterogeneous processor, the type and parameters for the neural network model in the neural network data, determining for each neural network layer respectively whether an available dedicated core exists, allocating a corresponding generic core or dedicated core for each neural network layer, to obtain a core sequence corresponding to the neural network layer, sending, by the logic control core in the heterogeneous processor, addresses corresponding to the neural network data and the instructions for the neural network operations to the dedicated core or generic core corresponding to the neural network layer, sending a serial number of a next dedicated core or generic core in the core sequence to the dedicated core or the generic core corresponding to the neural network layer, reading, by the dedicated core and generic core corresponding to the neural network layer, the neural network data and the instructions of the neural network operations from the addresses, performing the neural network operations, sending a computation result to an assigned address of a shared cache, and controlling, by the logic control core, the shared cache to write the computation result of the neural network layer back to the memory.

14. The neural network computation method of claim 13, wherein the available dedicated core is a dedicated core that supports the neural network operations and supports size of the neural network operation.

15. The neural network computation method of claim 14, wherein the neural network operations include a pulse neural network computation, a convolution computation, a fully connected layer computation, a concatenation computation, a bitwise addition/multiplication, a Relu computation, a pooling computation and/or a Batch Norm computation of the neural network.

\* \* \* \* \*